United States Patent [19]

Nakamura

[11] Patent Number: 5,835,374
[45] Date of Patent: Nov. 10, 1998

[54] CAD APPARATUS

[75] Inventor: Eiji Nakamura, Ikoma, Japan

[73] Assignee: Unixsoft Co., Ltd., Tokyo-To, Japan

[21] Appl. No.: 795,834

[22] Filed: Feb. 6, 1997

[30] Foreign Application Priority Data

Feb. 6, 1996 [JP] Japan .................................. 8-045489

[51] Int. Cl.⁶ .................................................. G06F 3/00
[52] U.S. Cl. ........................... 364/192; 364/188; 702/155
[58] Field of Search .................................. 364/188, 191,
364/192, 560; 345/433, 439, 441; 395/1,
10, 51, 54, 900; 702/155

[56] References Cited

U.S. PATENT DOCUMENTS

| | | | |
|---|---|---|---|
| 4,864,520 | 9/1989 | Setoguchi et al. | 364/520 |
| 5,412,762 | 5/1995 | Kondo | 364/474.23 |
| 5,425,109 | 6/1995 | Saga et al. | 382/187 |
| 5,548,698 | 8/1996 | Smith et al. | 345/439 |
| 5,615,321 | 3/1997 | Corn | 345/433 |

OTHER PUBLICATIONS

Omura, Mastering AutoCad, Sybex Publishing, 506–527, Dec. 1987.

*Primary Examiner*—John E. Barlow, Jr.
*Assistant Examiner*—Craig Steven Miller
*Attorney, Agent, or Firm*—Graham & James LLP

[57] ABSTRACT

A CAD apparatus includes an input device, a central processing unit, and a display device. In the CAD apparatus, the central processing unit uses an intersection/contact point calculation function to determine diagrammatical elements of points, lines, and circles which are additional elements by using the points, the lines, and the circles as fundamental elements in plotting and inputting necessary parameters to the input device, so that a macro-diagram is formed on a screen of the display device, with a diagram-forming process being performed by accumulation of constraint conditions.

4 Claims, 12 Drawing Sheets

FIG.5(G)
× ×
P₁ P₃
×        × ×
P₄       P₆ P₅
× ×
P₀ P₂
FIG.5(H)
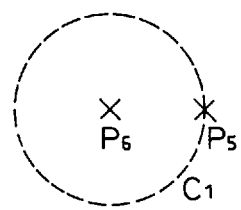
× ×
P₁ P₃
×        × ×
P₄       P₆ P₅
             C₁
× ×
P₀ P₂
FIG.5(I)
× ×
P₁ P₃
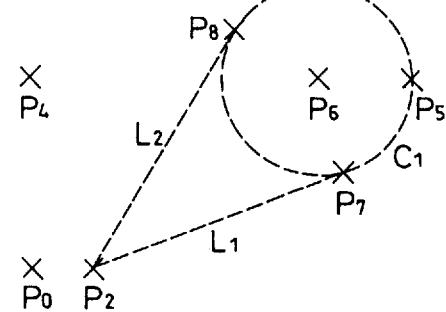

H = 100
W = 120
L = 70
R1 = 0
R2 = 9999

H = 20
W = 120
L = 10
R1 = 30
R2 = 50

H  =   20
W  =  120
L  =   20
R1 =   30
R2 = 9999

H  =  100
W  =   50
L  =    0
R1 =   50
R2 =    0

F I G. 12
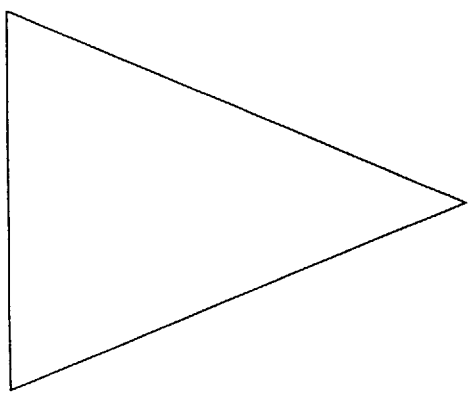
H = 100
W = 120
L = 0
R1 = 0
R2 = 9999
F I G. 13
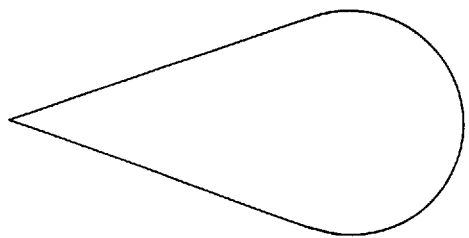
H = 0
W = 120
L = 0
R1 = 30
R2 = 9999

H = 100
W = 100
L = 100
R1 = 0
R2 = 9999

H = 0
W = 120
L = 0
R1 = 40
R2 = 30

F I G.16
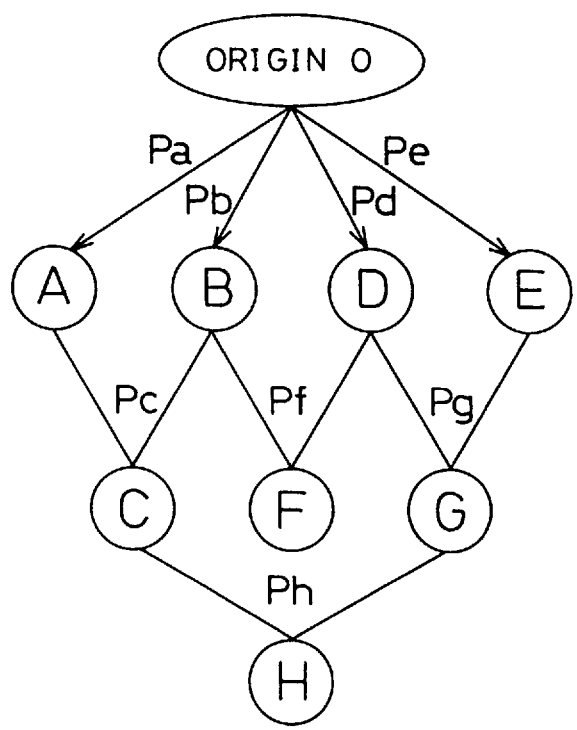

CAD APPARATUS

BACKGROUND OF THE INVENTION

1. Field of the Invention

The present invention relates to a CAD apparatus, and more particularly to a CAD apparatus for use in creating and generating a design drawing, utilizing a computer.

2. Description of the Prior Art

A CAD apparatus, such as a computer aided design software program running on a computer, is used to create a design drawing by a designer inputting information and desired data and instructions into a program running on a computer. The exchange of information occurs in the form of dialogue through a display device. As methods of creating the design drawing by means of the CAD apparatus, a macro program method and a parametric method have been used.

In a CAD apparatus using the macroprogram method, a macroprogram written by a macro-language is created and used to form a parametric diagram. An operator then can check the parametric diagram generated by the macroprogram on the display device to modify the macroprogram as a result of the operating checking the diagram and making sure it has all of the desired elements and arrangement of the elements. A desired diagram is completed by performing this operation repeatedly.

In a CAD apparatus using the parametric method, a rough parametric diagram is formed as the beginnings of a desired design in an early stage of a designing process. The operator inputs dimensions and related information to an input device while the operator is continuously checking the parametric diagram being created on the display device and can change the input information to modify the diagram. In the final stage of the design process, the parametric program is systemized to analogize the relationship between completed diagrams.

In the conventional CAD apparatus using the macroprogram method, it is necessary to modify the macroprogram if a designer desires to change a completed diagram in any way. As a result, the programmer is required to modify the macroprogram which requires time and effort and re-running the macroprogram. Thus, the completed diagram cannot be easily changed and modifications to a completed diagram are difficult and time-consuming.

In the conventional CAD apparatus using the parametric method, the parametric program is systemized to analogize or model the relationship between completed diagrams. Thus, there is a possibility that the completed diagram is erroneously transformed after performing enormous calculation. That is, because the CAD apparatus using the parametric method analogizes or calculates the relationship between completed diagrams, the completed diagram cannot be changed as frequently as the designer might desire.

SUMMARY OF THE INVENTION

The preferred embodiments of the present invention provide a CAD apparatus which allows a designer to transform a completed macro-diagram easily and whenever the designer desires.

A CAD apparatus according to the preferred embodiments of the present invention comprises an input device, a central processing unit, and a display device. Using a unique intersection/contact point calculation function, the central processing unit determines diagrammatical elements of points, lines, and circles, which comprise additional elements to be introduced into the diagram, by using the points, the lines, and the circles as fundamental elements in plotting and inputting necessary parameters to the input device so that a macro-diagram is formed on a screen of the display device, with the diagram-forming process being performed by collecting and obeying constraint conditions.

According to the preferred embodiments of the present invention, preferably, the input device comprises a key board and a pointing device such as a mouse, track ball or like device. Preferably, the central processing unit is connected with at least one of a RAM and a ROM either directly or indirectly.

According to the preferred embodiments of the present invention, the process of forming a diagram is performed by accumulating constraint conditions. Accordingly, a completed diagram can be transformed by substituting numerical values for parameters.

According to the preferred embodiments of the present invention, a designer can transform the completed macro-diagram easily by substituting numerical values for the parameters. Because the accumulation of the constraint conditions represent the designer's intended modification or design change, the designer can transform the completed macro-diagram easily and whenever the designer desires.

These and other elements, features, and advantages of the preferred embodiments of the present invention will be apparent from the following detailed description of the preferred embodiments of the present invention, as illustrated in the accompanying drawings.

BRIEF DESCRIPTION OF THE DRAWINGS

FIGS. 3 (A) through (C) are views showing the procedure of forming the diagram shown in FIG. 2, using the CAD apparatus shown in FIG. 1.

FIGS. 4 (D) through (F) are views showing the procedure of forming the diagram shown in FIG. 2, using the CAD apparatus shown in FIG. 1.

FIGS. 5 (G) through (I) are views showing the procedure of forming the diagram shown in FIG. 2, using the CAD apparatus shown in FIG. 1.

FIG. 12 is a view showing still another example of transforming the diagram shown in FIG. 2, by substituting numerical values for variables which are parameters.

FIG. 13 is a view showing still another example of transforming the diagram shown in FIG. 2, by substituting numerical values for variables which are parameters.

FIG. 16 is a view for describing the procedure of forming a diagram, using the CAD apparatus shown in FIG. 1.

DESCRIPTION OF PREFERRED EMBODIMENTS

Figure 1:
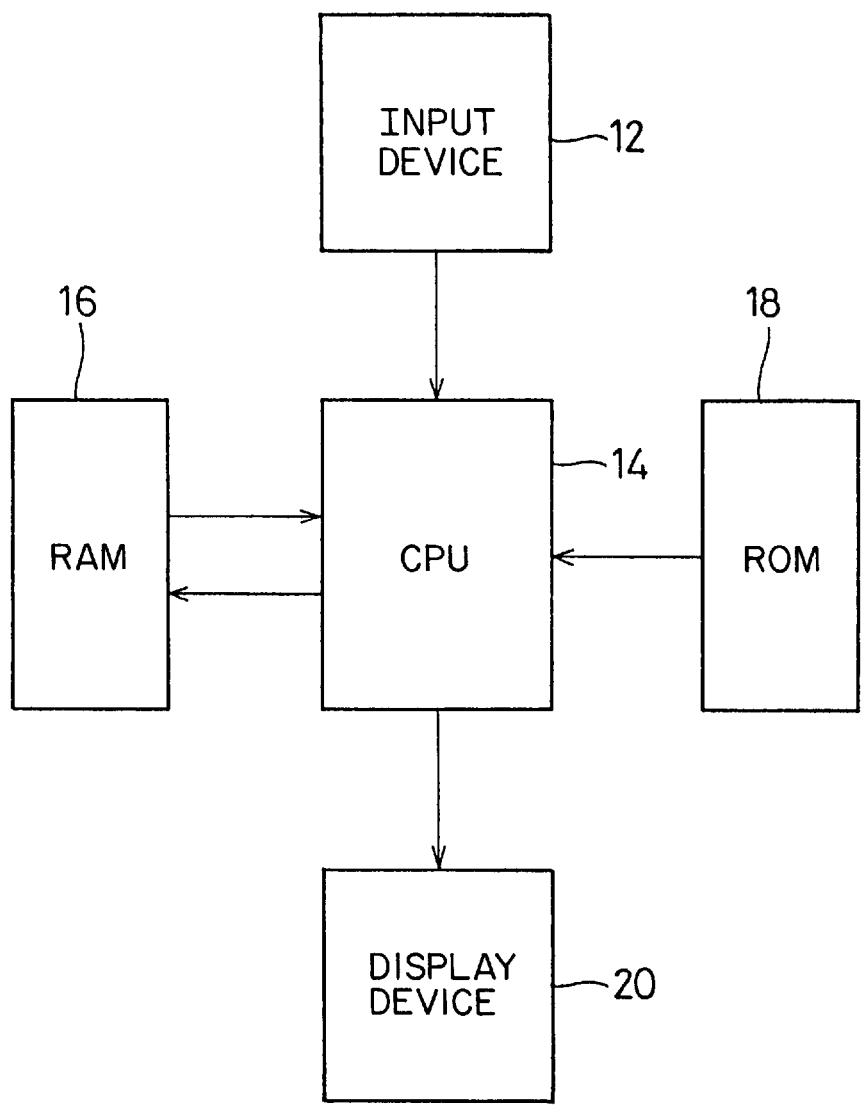
FIG. 1 is a block diagram showing an example of a preferred embodiment of the present invention.

FIG. 1 is a block diagram showing an example of a preferred embodiment of the present invention. A CAD apparatus 10 includes an input device 12. The input device 12 comprises a key board for inputting numerical values and characters; and a pointing device such as a mouse, trackball or similar device, for inputting coordinate positions on the screen of a display device which will be described later. Data is transferred from the input device 12 to a central processing unit 14. In the central processing unit 14, diagram data is constructed according to data and information input from the input device 12, and diagram processing is executed. The central processing unit 14 is preferably connected with a RAM 16 and a ROM 18. The RAM 16 is utilized as a calculation region in the diagram processing to be executed in the central processing unit 14. The ROM 18 stores a program for executing the diagram processing to be executed in the central processing unit 14. Processes and results of the diagram processing executed in the central processing unit 14 are displayed on a display device 20.

In the CAD apparatus 10 of the preferred embodiments of the present invention, a "intersection/contact point calculation function" is used. The central processing unit 14 determines necessary points, lines, and circles, based on all necessary points, lines, and circles required to make a draft diagram, using the "intersection/contact point calculation function." The central processing unit 14 calculates all additional patterns of points, lines, and circles which are diagrammatical elements automatically from points, lines, and circles and combinations thereof which are necessary for the draft diagram. Necessary diagrammatic elements are selectively designated from all the points, lines, and circles and automatically calculated. That is, diagrammatical elements of points, lines, and circles which are additional elements are created by using the points, the lines, and the circles as fundamental elements in plotting and inputting necessary parameters to the input device 12. That is, using the "intersection/contact point calculation function", any desired diagrams can be created by a unique method, namely, without using a plotting command. The process of forming the diagram proceeds to a step of accumulating constraint conditions.

Table 1 shows the relationship between the fundamental element in plotting and the additional element in the "intersection/contact point calculation function". The "intersection/contact point calculation function" determines and generates the additional elements, referred to above, from the fundamental elements as described below with reference to Table 1.

(A) When the number of the fundamental elements in plotting is one:

(a) When the fundamental element in plotting is a "point", and the additional element is a "point":

A distance L and an angle A are inputted to the input device 12 by setting a "point" of the fundamental element as the reference point so as to generate a "point" of the additional element. It is possible to obtain a "point" of the additional element by inputting a distance X from a "point" of the fundamental element in x-direction and a distance Y therefrom in y-direction to the input device 12.

(b) When the fundamental element is a "point" and the additional element is a "line":

A distance L and an angle A are inputted to the input device 12 by setting a "point" of the fundamental element as the reference point so as to obtain a "line" of the additional element.

(c) When the fundamental element is a "point" and the additional element is a "circle":

A radius R is inputted to the input device 12 by setting a "point" of the fundamental element as the reference point so as to obtain a "circle" of the additional element.

(d) When the fundamental element is a "line" and the additional element is a "line":

A distance L is inputted to the input device 12 by setting a "line" of the fundamental element as the reference so as to obtain a "line" of the additional element parallel with a "line" of the fundamental element.

(e) When the fundamental element is a "circle" and the additional element is a "point":

A divided number x of a "circle" of the fundamental element is inputted to the input device 12 so as to obtain a "point" of the additional element as divided points on the circumference. It is possible to obtain a "point" of the additional element as the center of the a "circle" of the fundamental element.

(f) When the fundamental element is a "circle" and the additional element is a "line":

An angle A is inputted to the input device 12 by setting a "circle" of the fundamental element as the reference so as to obtain a "line" of the additional element as a tangent which touches a "circle" of the fundamental element.

(g) When the fundamental element is a "circle" and the additional element is a "circle":

An increased amount or a decreased amount of the radius of a "circle" of the fundamental element amount so as to obtain a "circle" of the additional element as a concentric circle of the fundamental element.

(B) When the number of the fundamental elements in plotting is two:

(a) When the fundamental element is "point" and "point", and the additional element is "point":

The distance between "point" and "point" is divided at a ratio of m:n so as to obtain "point" of the additional element.

(b) When the fundamental element is "point" and "point" and the additional element is "line":

"Line" of the additional element is obtained as the straight line connecting "point" and "point" of the fundamental element to each other.

(c) When the fundamental element is "point" and "point" and the additional element is "circle":

A radius R is inputted to the input device 12 by setting "point" and "point" of the fundamental element as the reference points so as to obtain "circle" of the additional element as a circle having the radius R such that "point" and "point" of the fundamental element lie on the circle.

(d) When the fundamental element is "line" and "line" and the additional element is "point":

"Point" of the additional element is obtained as the intersection of "line" and "line" of the fundamental element.

(e) When the fundamental element is "line" and "line" and the additional element is "line":

"Line" of the additional element is obtained as a line passing through the intersection of "line" and "line" of the fundamental element and dividing "line" and "line" thereof into two equal parts.

(f) When the fundamental element is "line" and "line" and the additional element is "circle":

A radius R is inputted to the input device 12 by setting "line" and "line" of the fundamental element as the reference lines so as to obtain the "circle" as a circle having the radius R and tangential to "line" and "line" of the fundamental element.

(g) When the fundamental element is "circle" and "circle" and the additional element is "points":

"Points" of the additional element is obtained as intersections of "circle" and "circle" of the fundamental element.

(h) When the fundamental element is "circle" and "circle" and the additional element is "line":

"Line" of the additional element is obtained as a tangent to "circle" and "circle" of the fundamental element.

(i) When the fundamental element is "circle" and "circle" and the additional element is "circle":

A radius R is inputted to the input device 12 by setting "circle" and "circle" of the fundamental element as the reference circles so as to obtain the "circle" as a circle having the radius R and tangential to "circle" and "circle" of the fundamental element.

(j) When the fundamental element is "point" and "line" and the additional element is "point":

"Point" of the additional element is obtained as the intersection of "line" of the fundamental element and the perpendicular from "point" of the fundamental element to "line" thereof.

(k) When the fundamental element is "point" and "line" and the additional element is "line":

"Line" of the additional element is obtained as the line passing through "point" of the fundamental element and parallel to "line" of the fundamental element or the line passing through "point" of the fundamental element and perpendicular thereto.

(l) When the fundamental element is "point" and "line" and the additional element is "circle":

"Circle" of the additional element is obtained as the circle having its center at "point" and touching "line" of the fundamental element.

(m) When the fundamental element is "point" and "circle" and the additional element is "point":

"Point" of the additional element is obtained as a point distant by x from "point" of the fundamental element on the circumference of "circle" of the fundamental element.

(n) When the fundamental element is "point" and "circle" and the additional element is "line":

"Line" of the additional element is obtained as a tangent from "point" of the fundamental element to "circle" of the fundamental element.

(o) When the fundamental element is "point" and "circle" and the additional element is "circle":

A radius R is inputted to the input device 12 so as to obtain "circle" of the additional element as the circle passing through "point" of the fundamental element and touching "circle" of the fundamental element.

(p) When the fundamental element is "line" and "circle" and the additional element is "point":

"Points" of the additional element is obtained as intersections of "line" of the fundamental element and "circle" of the fundamental element.

(q) When the fundamental element is "line" and "circle" and the additional element is "line":

"Line" of the additional element is obtained as a line tangent to "circle" of the fundamental element and parallel to "line" of the fundamental element or a line tangent to "circle" of the fundamental element and perpendicular to "line" of the fundamental element.

(r) When the fundamental element is "line" and "circle" and the additional element is "circle":

A radius R is inputted to the input device 12 so as to obtain "circle" of the additional element as a circle having a radius R and touching "line" of the fundamental element and "circle" of the fundamental element.

(C) When the number of the fundamental elements in plotting is three:

(a) When the fundamental element is "point", "line", and "circle" and the additional element is "circle":

"Circle" of the additional element is obtained as the circle passing through "point" of the fundamental element and touching "line" and "circle" of the fundamental element.

(b) When the fundamental element is "point", "point", and "line" and the additional element is "circle":

"Circle" of the additional element is obtained as a circle passing through "point" and "point" of the fundamental element and touching "line" of the fundamental element.

(c) When the fundamental element is "point", "point", and "circle" and the additional element is "circle":

"Circle" of the additional element is obtained as a circle passing through "point" and "point" of the fundamental element and touching "circle" of the fundamental element.

(d) When the fundamental element is "point", "line", and "line" and the additional element is "circle":

"Circle" of the additional element is obtained as a circle passing through "point" of the fundamental element and touching "line" and "line" of the fundamental element.

(e) When the fundamental element is "line", "line", and "line" and the additional element is "circle":

"Circle" of the additional element is obtained as a circle touching "line", "line", and "line" of the fundamental element.

(f) When the fundamental element is "line", "line", and "circle" and the additional element is "circle":

"Circle" of the additional element is obtained as a circle touching "line" and "line" and "circle" of the fundamental element.

(g) When the fundamental element is "line", "circle", and "circle" and the additional element is "circle":

"Circle" of the additional element is obtained as a circle touching "line" of the fundamental element and "circle" and "circle" of the fundamental element.

(h) When the fundamental element is "circle", "circle", and "circle" and the additional element is "circle":

"Circle" of the additional element is obtained as a circle touching "circle", "circle", and "circle" of the fundamental element.

As described above, in the CAD apparatus according to the preferred embodiments of the present invention, using the novel "intersection/contact point calculation function", any desired diagram can be created by a unique non-command method, namely, without using a plotting command. The procedure of creating the diagram having the configuration shown in FIG. 2 by using the CAD apparatus 10 of the preferred embodiments of the present invention is described below.

Figure 2:
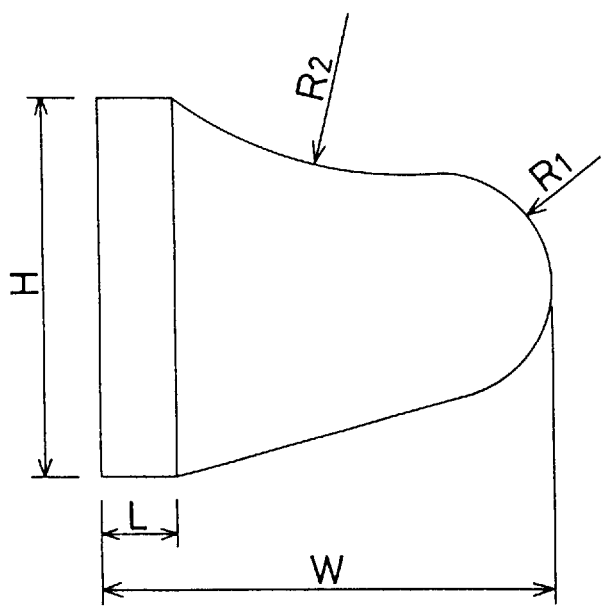
FIG. 2 is a view showing an example of a diagram to be created, using the CAD apparatus shown in FIG. 1.

A designer composes diagram data by inputting numerical values and/or characters to the input device 12 while the designer is checking a diagram displayed on the screen of the display device 20 so as to create the diagram having the configuration shown in FIG. 2. As described previously, the input device 12 comprises the key board for inputting numerical values and characters; and the pointing device for inputting coordinate positions on the screen of the display device 20.

Figures 3A, 3B, 3C:
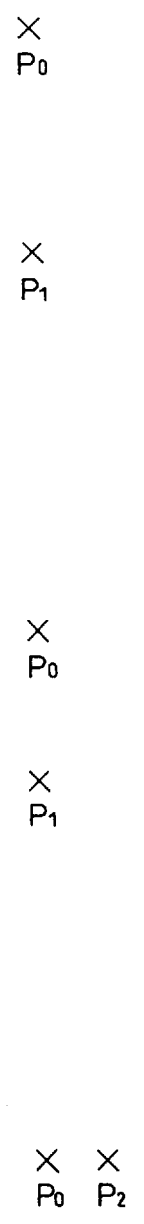
Figures 4D, 4E, 4F:
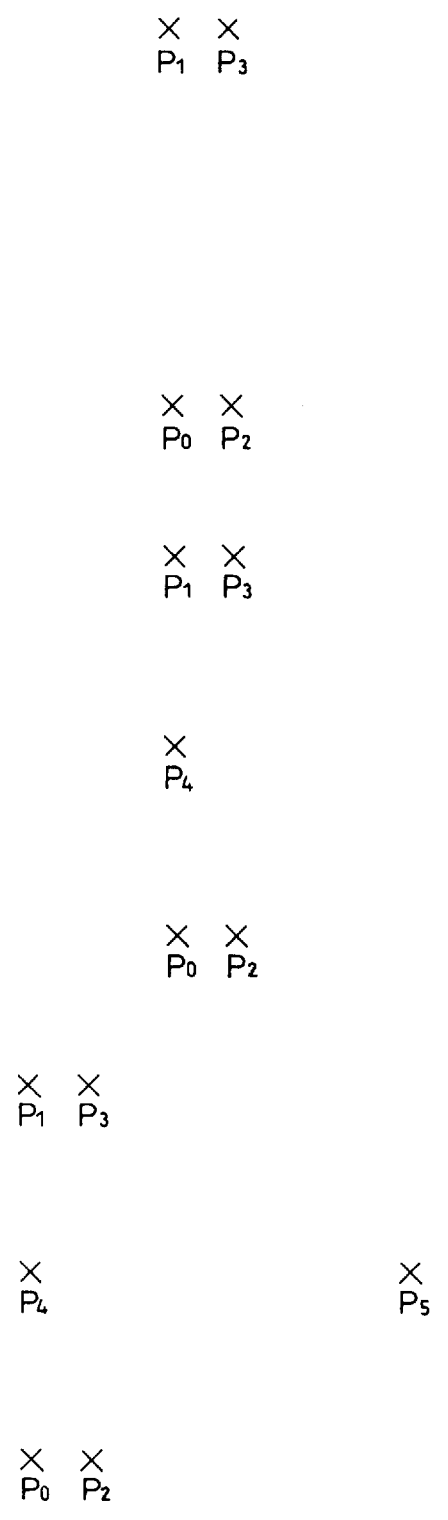

First, the designer inputs the data of a point $P_0$ to the input device 12 to have a point $P_0$ which is the start point displayed on the screen of the display device 20, as shown in FIG. 3 (A). Then, the designer inputs a distance h in y-direction to the input device 12 by setting the point $P_0$ as the reference to create a point $P_1$, as shown in FIG. 3 (B). Then, the designer inputs a variable H to the input device 12 as the parameter of the distance h. Then, the designer inputs a distance l in x-direction to the input device 12 by setting the point $P_0$ as the reference to create a point $P_2$, as shown in FIG. 3 (C). Then, the designer inputs a variable L to the input device 12 as the parameter of the distance l. Further, the designer inputs a distance l in x-direction to the input device 12 by setting the point $P_1$ as the reference to create a point $P_3$ in a method similar to that of creating the point $P_2$, as shown in FIG. 4 (D). As described above, the variable L has been inputted to the input device 12 as the parameter of the distance l.

Then, the designer inputs a division number 2 by setting the points $P_0$ and $P_1$ as the reference to create a point $P_4$ which is the midpoint between the points $P_0$ and $P_1$. Further, the designer inputs a distance w in x-direction to the input device 12 to create a point $P_5$ as shown in FIG. 4 (F). Then, the designer inputs a variable W to the input device 12 as the parameter of the distance w. Further, the designer inputs a distance (−r1) in x-direction by setting the point $P_5$ as the reference to create a point $P_6$ as shown in FIG. 5 (G). Then, the designer inputs a variable R1 to the input device 12 as the parameter of the distance r1. At this time, in order to create point $P_6$, the designer may input the distance (−r1) in x-direction after inputting the variable R1 to the input device 12 as the parameter of the distance r1.

Figure 6J:
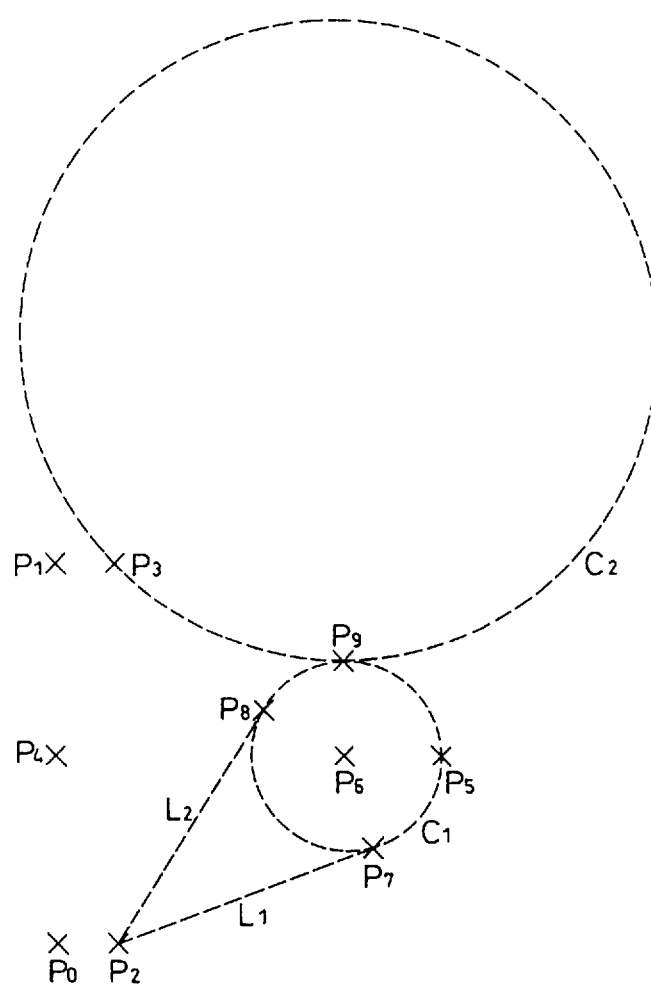
FIG. 6 (J) is a view showing the procedure of forming the diagram shown in FIG. 2, using the CAD apparatus shown in FIG. 1.
Figure 7K:
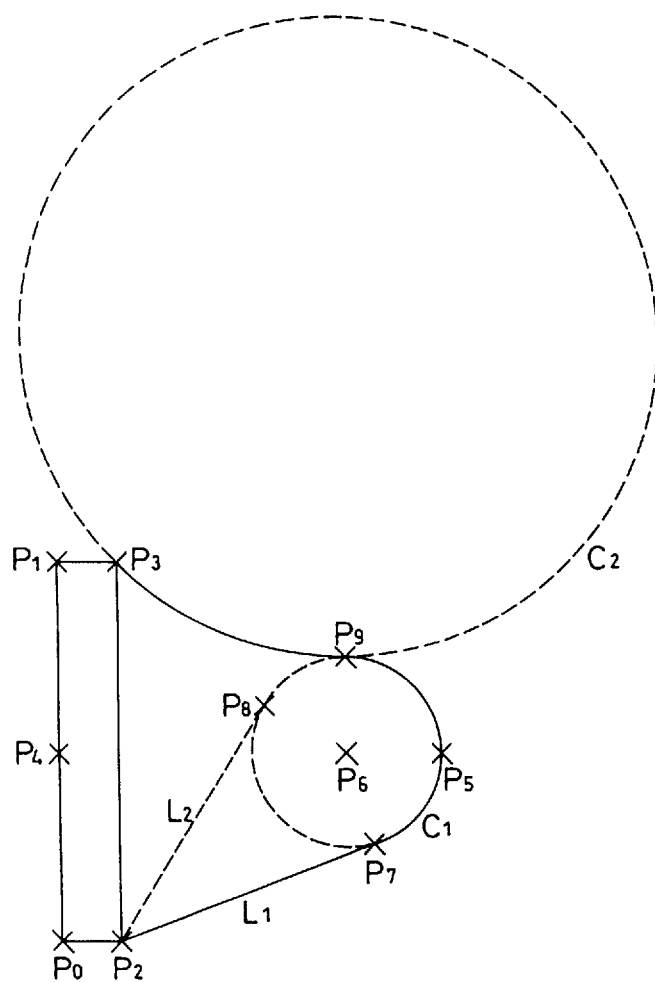
FIG. 7 (K) is a view showing the procedure of forming the diagram shown in FIG. 2, using the CAD apparatus shown in FIG. 1.

Thereafter, the designer creates a circle $C_1$ passing through the point $P_5$, with the center positioned at the point $P_6$ by setting the points $P_5$ and the point $P_6$ as the reference. Then, as shown in FIG. 5 (I), the designer creates lines $L_1$ and $L_2$ passing through the point $P_2$ and being tangent to the circle $C_1$ by setting the point $P_2$ and the circle $C_1$ as the reference. At this time, simultaneously with the creation of the lines $L_1$ and $L_2$, contact points $P_7$ and $P_8$ are created on the circle $C_1$. Further, the designer inputs a radius r2 to the input device 12 by setting the point $P_3$ and the circle $C_1$ as the reference to create a circle $C_2$ having the radius r2 and passing through the point $P_3$ and touching the circle $C_1$ as shown in FIG. 6 (J). Then, the designer inputs a variable R2 as the parameter of the radius r2. At this time, simultaneously with the creation of the circle $C_2$, a contact point $P_9$ is created on the circle $C_2$.

The initial diagram (diagram including point, line, and circle) is used to create the diagram having the configuration shown in FIG. 2 through the above-described procedure.

Then, necessary points (point $P_0$–point $P_1$, point $P_0$–point $P_2$, point $P_1$–point $P_3$, point $P_2$–point $P_3$, point $P_2$–point $P_7$ (line $L_1$), point $P_7$–point $P_9$, and point $P_9$–point $P_3$) are connected with lines by means of the pointing device of the input device 12 to create the diagram having the configuration shown in FIG. 2.

In this diagram processing, the variables H, W, L, R1, and R2 are given. Thus, the designer can easily transform the completed macro-diagram as the designer desires by substituting appropriate numerical values for the variables H, W, L, R1, and R2. In the diagram shown in FIG. 2, 100, 120, 20, 30, and 100 are substituted for H, W, L, R1, and R2, respectively.

Figure 8:
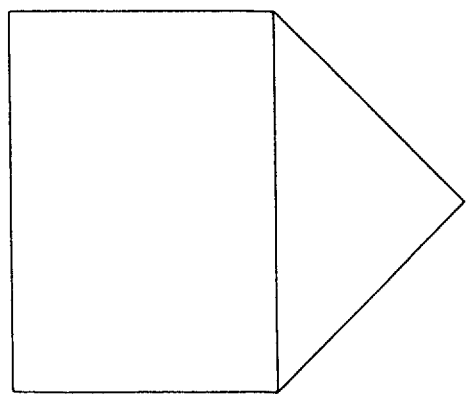
FIG. 8 is a view showing an example of transforming the diagram shown in FIG. 2, by substituting numerical values for variables which are parameters.
Figure 9:
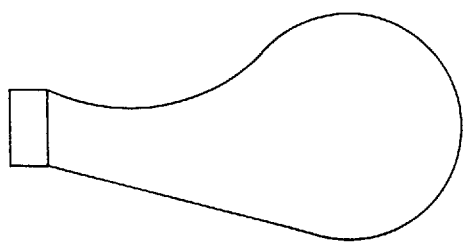
FIG. 9 is a view showing another example of transforming the diagram shown in FIG. 2, by substituting numerical values for variables which are parameters.
Figure 10:
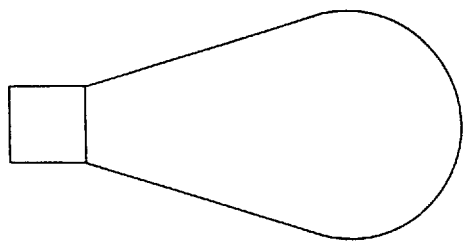
FIG. 10 is a view showing still another example of transforming the diagram shown in FIG. 2, by substituting numerical values for variables which are parameters.
Figure 11:
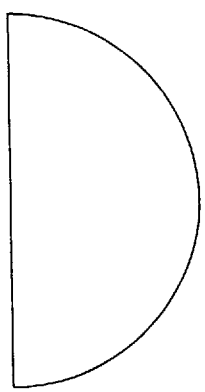
FIG. 11 is a view showing still another example of transforming the diagram shown in FIG. 2, by substituting numerical values for variables which are parameters.
Figure 14:
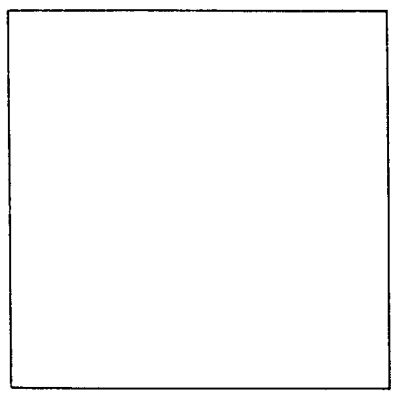
FIG. 14 is a view showing still another example of transforming the diagram shown in FIG. 2, by substituting numerical values for variables which are parameters.
Figure 15:
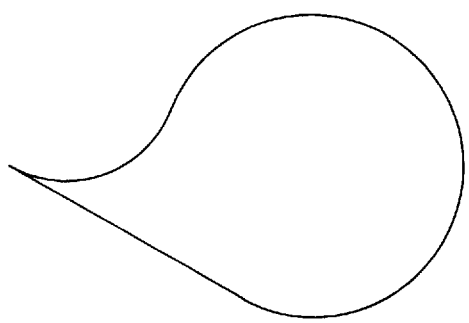
FIG. 15 is a view showing still another example of transforming the diagram shown in FIG. 2, by substituting numerical values for variables which are parameters.

FIG. 8 is a view showing an example of a diagram obtained by transforming the diagram shown in FIG. 2 by substituting numerical values for the variables. In the diagram shown in FIG. 8, 100, 120, 70, 0, and 9999 are substituted for H, W, L, R1, and R2, respectively. FIG. 9 is a view showing another example of a diagram obtained by transforming the diagram shown in FIG. 2 by substituting numerical values for the variables. In the diagram shown in FIG. 9, 20, 120, 10, 30, and 50 are substituted for H, W, L, R1, and R2, respectively. FIG. 10 is a view showing still another example of a diagram obtained by transforming the diagram shown in FIG. 2 by substituting numerical values for the variables. In the diagram shown in FIG. 10, 20, 120, 20, 30, and 9999 are substituted for H, W, L, R1, and R2, respectively. FIG. 11 is a view showing still another example of a diagram obtained by transforming the diagram shown in FIG. 2 by substituting numerical values for the variables. In the diagram shown in FIG. 11, 100, 50, 0, 50, and 0 are substituted for H, W, L, R1, and R2, respectively. FIG. 12 is a view showing still another example of a diagram obtained by transforming the diagram shown in FIG. 2 by substituting numerical values for the variables. In the diagram shown in FIG. 12, 100, 120, 0, 0, and 9999 are substituted for H, W, L, R1, and R2, respectively. FIG. 13 is a view showing still another example of a diagram obtained by transforming the diagram shown in FIG. 2 by substituting numerical values for the variables. In the diagram shown in FIG. 13, 0, 120, 0, 30, and 9999 are substituted for H, W, L, R1, and R2, respectively. FIG. 14 is a view showing still another example of a diagram obtained by transforming the diagram shown in FIG. 2 by substituting numerical values for the variables. In the diagram shown in FIG. 14, 100, 100, 100, 0, and 9999 are substituted for H, W, L, R1, and R2, respectively. FIG. 15 is a view showing still another example of a diagram obtained by transforming the diagram shown in FIG. 2 by substituting numerical values for the variables. In the diagram shown in FIG. 15, 0, 120, 0, 40, and 30 are substituted for H, W, L, R1, and R2, respectively.

FIG. 16 is a view for describing the procedure of forming a diagram, using the CAD apparatus 10 shown in FIG. 1 by means of the "intersection/contact point calculation function". In FIG. 16, A, B, C, D, E, F, G, and H show diagrammatic elements such as points, lines, circular arcs and the like. In FIG. 16, Pa, Pb, Pc, Pd, Pe, Pf, Pg, and Ph are parameters for defining diagrams. In most cases, these parameters are each a singular number but in some cases, a combination of a plural number.

In an example shown in FIG. 16, the diagrammatic elements A, B, D, and E which are additional elements are formed from an origin O which is the fundamental element by using the parameters Pa, Pb, Pd, and Pe. The diagram element C which is an additional element is formed from the diagrammatic elements A and B by using the parameter Pc. Further, the diagram element F which is an additional element is formed from the diagrammatic elements B and D by using the parameter Pf. Then, the diagram element G which is an additional element is formed from the diagrammatic elements D and E by using the parameter Pg. Then, the diagram element H which is an additional element is formed from the diagrammatic elements C and G by using the parameter Ph.

As shown in FIG. 16, according to the preferred embodiments of the present invention, the process of creating a diagram proceeds in the form of the accumulation of constraint conditions. Accordingly, when the parameter Pb is changed, the figures of the diagrammatic elements B, F, C, and H are transformed, with them being constrained. For example, the diagrammatic element C is determined as a solution of simultaneous equations constituted of the diagrammatic elements A and B and the parameter Pc. Because the diagrammatic element C is determined not by a numerical value but by the parameter Pc as well as the diagrammatic elements A and B, the diagrammatic element C is transformed by substituting a numerical for the parameter Pc. That is, the process of creating the diagram proceeds by accumulating constraint conditions wherein the accumulation of constraint conditions represent the designer's intention. Therefore, the diagrammatic element C is transformed according to the designer's intention.

According to the preferred embodiments of the present invention, the designer can transform the completed macro-diagram easily by substituting numerical values for the parameter. In addition, the designer can transform the completed macro-diagram easily. Because the accumulation of the constraint conditions represents the designer's intention, the designer can transform the completed macro-diagram easily as the designer desires.

While the invention has been particularly shown and described with reference to preferred embodiments thereof, it will be understood by those skilled in the art that the foregoing and other changes in form and details may be made therein without departing from the spirit and scope of the invention.

TABLE 1

| Fundamental element in plotting | Additional element | | |
|---|---|---|---|
| | Point | Line | Circle |
| One element | | | |
| Point | ○ | ○ | ○ |
| Line | | ○ | |
| Circle | ○ | ○ | ○ |
| Two elements | | | |
| Point and point | ○ | ○ | ○ |

TABLE 1-continued

| Fundamental element in plotting | Additional element | | |
|---|---|---|---|
| | Point | Line | Circle |
| Line and line | ○ | ○ | ○ |
| Circle and circle | ○ | ○ | ○ |
| Point and line | ○ | ○ | ○ |
| Point and circle | ○ | ○ | ○ |
| Line and circle | ○ | ○ | ○ |
| Three elements | | | |
| Point, line, and circle | | | ○ |
| Point, point, and line | | | ○ |
| Point, point, and circle | | | ○ |
| Point, line, and line | | | ○ |
| Point, line, and circle | | | ○ |
| Line, line, and line | | | ○ |
| Line, line, and circle | | | ○ |
| Line, circle, and circle | | | ○ |
| Circle, circle, and circle | | | ○ |

What is claimed is:

1. A CAD apparatus comprising:

an input device;

a central processing unit; and a display device; wherein the central processing unit executes a macroprogram which includes an intersection/contact point calculation device for determining diagrammatical elements including points, lines, and circles comprising additional elements by using points, lines, and circles as fundamental elements in plotting and inputting necessary parameters input via the input device to generate a macro-diagram on the display device, the central processing unit executing the macroprogram such that a diagram-forming process is performed by accumulating constraint conditions and a diagram-modifying process for changing an already generated completed diagram is performed by substituting numerical values for the necessary parameters.

2. The CAD apparatus according to claim 1, wherein the input device comprises a key board and a pointing device.

3. The CAD apparatus according to claim 1, wherein the central processing unit is connected with at least one of a RAM and a ROM.

4. The CAD apparatus according to claim 2, wherein the central processing unit is connected with at least one of a RAM and a ROM.

* * * * *